United States Patent
Nemeth et al.

(10) Patent No.: US 12,302,181 B2
(45) Date of Patent: May 13, 2025

(54) ENHANCEMENTS FOR FASTER BWP SWITCHING IN MOBILE COMMUNICATIONS

(71) Applicant: MediaTek Singapore Pte. Ltd., Singapore (SG)

(72) Inventors: Jozsef Gabor Nemeth, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 220 days.

(21) Appl. No.: 17/577,368

(22) Filed: Jan. 17, 2022

(65) Prior Publication Data

US 2022/0264402 A1 Aug. 18, 2022

Related U.S. Application Data

(60) Provisional application No. 63/150,606, filed on Feb. 18, 2021.

(51) Int. Cl.
*H04W 72/00* (2023.01)
*H04L 5/00* (2006.01)
*H04W 36/06* (2009.01)
*H04W 72/044* (2023.01)
*H04W 72/20* (2023.01)

(52) U.S. Cl.
CPC .......... *H04W 36/06* (2013.01); *H04L 5/0096* (2013.01); *H04W 72/044* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2019/0166066 A1 | 5/2019 | Ang et al. | |
| 2019/0268905 A1* | 8/2019 | Zhou | H04W 72/23 |
| 2019/0313437 A1 | 10/2019 | Jung et al. | |
| 2019/0394710 A1* | 12/2019 | Ugurlu | H04L 5/0098 |
| 2020/0351039 A1 | 11/2020 | Zhou et al. | |
| 2020/0351738 A1 | 11/2020 | Huang et al. | |

(Continued)

FOREIGN PATENT DOCUMENTS

| | | | | |
|---|---|---|---|---|
| CN | 111919413 A | | 11/2020 | |
| WO | WO2021026926 | * | 2/2021 | ............ H04W 72/00 |

OTHER PUBLICATIONS

Taiwan Intellectual Property Office, Office Action in Taiwan Patent Application No. 111104837, May 9, 2023.

(Continued)

*Primary Examiner* — Abdelillah Elmejjarmi
(74) *Attorney, Agent, or Firm* — Andy M. Han; Han IP PLLC

(57) ABSTRACT

Various examples pertaining to enhancements for faster bandwidth part (BWP) switching in mobile communications are described. An apparatus, implementable in a user equipment (UE), receives a trigger from a network node. In response to receiving the trigger, the UE performs BWP switching with a restriction on software (SW) or radio frequency (RF) reconfiguration such that the BWP switching is faster with the restriction than without the restriction. The UE then performs a transmission to the network node after the BWP switching.

10 Claims, 6 Drawing Sheets

(56) References Cited

U.S. PATENT DOCUMENTS

2021/0184824 A1\* 6/2021 Kwak ................... H04L 5/0094
2022/0279485 A1\* 9/2022 Yang .................... H04W 72/04
2024/0073870 A1\* 2/2024 Mu ...................... H04W 72/04

OTHER PUBLICATIONS

China National Intellectual Property Administration, First Office Action in China Patent Application No. 202210118409.8, Oct. 25, 2024.

\* cited by examiner

ENHANCEMENTS FOR FASTER BWP SWITCHING IN MOBILE COMMUNICATIONS

CROSS REFERENCE TO RELATED PATENT APPLICATION(S)

The present disclosure is part of a non-provisional application claiming the priority benefit of U.S. Patent Application No. 63/150,606, filed 18 Feb. 2021, the content of which being incorporated by reference in its entirety.

TECHNICAL FIELD

The present disclosure is generally related to mobile communications and, more particularly, to enhancements for faster bandwidth part (BWP) switching in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) specification(s) for 5th Generation (5G) New Radio (NR), BWP switching for a single component carrier (CC) in a licensed spectrum is specified in Release 15 and Release 16 (Rel-15/16) in Technical Specification (TS) 38.133. Specifically, trigger to start BWP switching in downlink (DL) slot n can be done in either of two approaches. A first approach involves a downlink control information (DCI)-based BWP switch request at DL slot n on a serving cell in that a DCI triggering BWP switching (during the first three symbols) is the only transmission to a user equipment (UE). In a second approach, slot n is the first slot of a DL subframe (FR1) or DL half-subframe (FR2) immediately after a BWP-inactivity timer bwp-InactivityTimer expires on a serving cell. The UE is to receive a physical downlink shared channel (PDSCH) (for DL active BWP switch) or to transmit a physical uplink shared channel (PUSCH) (for uplink (UL) active BWP switch) on the new BWP on the serving cell on which BWP switch occurs and, more specifically, on the first DL or UL slot immediately after a time duration of BWP switching delay, $T_{BWPswitchDelay}$, which starts from the beginning of DL slot n. Depending on UE capability bwp-SwitchingDelay, the UE is to finish BWP switch within the time duration $T_{BWPswitchDelay}$ as defined in Table 8.6.2-1 in the 3GPP specification.

Regarding BWP switching timeline as defined in Rel-15/16, transition timeline $T_{BWPswitchDelay}$ is a sum of DCI reception and parsing, Layer 1 (L1) reconfiguration, radio frequency (RF) retuning/bandwidth (BW) adjustment and automatic gain control (AGC) setting, and slot boundary alignment. Thus, the duration of $T_{BWPswitchDelay}$ depends on UE capability, as BWP switching typically involves changing of subcarrier spacing (SCS) and that BWP switch delay is determined by the smaller SCS between the SCS before BWP switch and the SCS after BWP switch. Also, during $T_{BWPswitchDelay}$, there is no transmission or reception by the UE is allowed except for the BWP switching DCI. Therefore, there is a need for a solution of enhancements for faster BWP switching in mobile communications to improve overall system performance.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving enhancements for faster BWP switching in mobile communications.

In one aspect, a method may involve receiving a trigger from a network node. The method may also involve, in response to receiving the trigger, performing BWP switching with a restriction on software (SW) or radio frequency (RF) reconfiguration such that the BWP switching is faster with the restriction than without the restriction. The method may further involve performing a transmission to the network node after the BWP switching.

In another aspect, a method may involve receiving a trigger from a network node. The method may also involve, in response to receiving the trigger, performing BWP switching with a redefined beginning of a BWP transition timeline such that the BWP switching is faster with the redefined beginning of the BWP transition timeline than without the redefined beginning of the BWP transition timeline. The method may further involve performing a transmission to the network node after the BWP switching.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancements for faster BWP switching in mobile communications. According to the present disclosure, a number of possible solutions may be implemented separately or jointly. That is, although these possible solutions may be described below separately, two or more of these possible solutions may be implemented in one combination or another.

Figure 1:
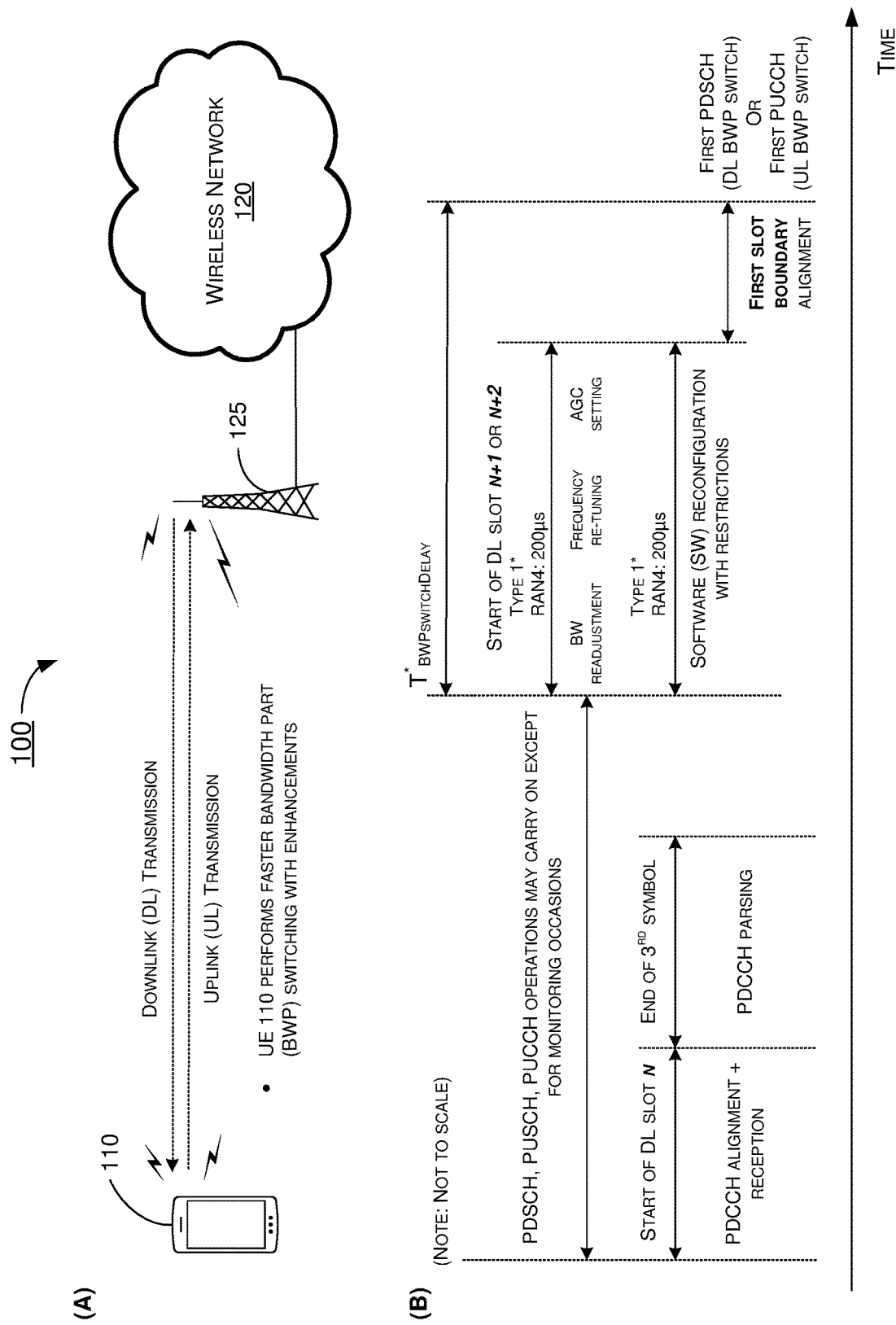
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to part (A) of FIG. 1, network environment 100 may involve a UE 110 in wireless communication with a wireless network 120 (e.g., a 5G NR mobile network or another type of network such as an NTN). UE 110 may be in wireless communication with wireless network 120 via a base station or network node 125 (e.g., an eNB, gNB or transmit-receive point (TRP)). Referring to part (B) of FIG. 1, under various proposed schemes in accordance with the present disclosure, in the duration between the beginning of the start of DL slot n and the beginning of a modified time duration of BWP switching delay ($T^*_{BWPswitchDelay}$), PDSCH, PUSCH and PUCCH operations may be carried on by UE 110 except for monitoring occasions. The modified time duration $T^*_{BWPswitchDelay}$ may begin at the start of DL slot n+1 or n+2. After $T^*_{BWPswitchDelay}$, the first PDSCH (after DL BWP switch) or first PUCCH (after UL BWP switch) may be performed by UE 110. In network environment 100, UE 110 and wireless network 120 (via network node 125) may implement various schemes pertaining to enhancements for faster BWP switching in mobile communications, as described below.

Under a first proposed scheme in accordance with the present disclosure, restricted software (SW) reconfigurations may be applied such that all configurations for (DL or UL) BWP fast switching may be maintained identical. The first proposed scheme may not be applied to certain exceptions including, for example and without limitation, resource block (RB) offset, BWP index, and attributes that may govern the BWP switching.

Under a second proposed scheme in accordance with the present disclosure, SW reconfigurations may be applied such that only a subset of the configurations may be maintained. For instance, some of the configurations that are maintained may include, for example and without limitation, same subcarrier spacing, same cyclic prefix (CP), same bandwidth (BW) but different RB offset with respect to the RB determined by higher-layer parameters offset-pointA-low-scs and ref-scs, different BWP indexes, partly or fully the same physical uplink control channel (PUCCH)/PUSCH/configured grant (CG)/sounding reference signal (SRS) configuration for UL-BWP (e.g., same time domain resource assignment (TDRA), K1 and/or K2), and partly or fully the same physical downlink control channel (PDCCH)/PDSCH/semi-persistent spacing (SPS)/radio link monitoring (RLM) configuration for DL-BWP (e.g., same TDRA and/or K0). Under the second proposed scheme, because all or most configurations are unaltered by the BWP switching, parallel or considerably overlapping software and/or RF reconfiguration may be assumed for BWP switching UE processing timeline.

Under a third proposed scheme in accordance with the present disclosure, restricted RF reconfigurations may be applied. For instance, only a center frequency and the BW may be allowed to change, according to a restricted set. Optionally, the number of allowed center frequencies and/or BWs may be restricted. Also optionally, BW may be mapped from the center frequency, or vice versa. For instance, there may be certain combinations of center frequencies.

Under a fourth proposed scheme in accordance with the present disclosure, there may be different approaches to faster triggering for BWP switching. In a first approach, BWP switching in DCI in slot n may trigger switching e.g., in slot n+1 (for 15 MHz and 30 MHz) or slot n+2 (for 60 MHz and 120 MHz) from a duration budgeted for DCI parsing. This allows redefining the beginning for the transition timeline (which excludes DCI reception and parsing). Before the transition timeline starts, UE 110 may be expected to proceed with its receptions and transmissions as normal.

Optionally, in the first approach, for the DCI triggering the BWP switching, restrictions may apply on the PDCCH candidates, hence the decoding effort to speed up the BWP switching. For instance, a new search space (SS) may be defined where the scheduling DCI may be used for BWP switching and UE 110 may prioritize monitoring this SS. Additionally, blind decoding (BD) and aggregation level (AL) restrictions may be imposed on this SS. As another example, the DCI format and/or radio network temporary identifier (RNTI) may be restricted for the scheduling DCI used for BWP scheduling.

Optionally, in the first approach, restrictions on monitoring occasions or PDCCH candidates following the BWP switching DCI may apply. For instance, on successfully decoding the DCI conveying the BWP switch, processing of the remaining monitoring occasions may be dropped by UE 110. Alternatively, or additionally, on successfully decoding the DCI conveying the BWP switching, processing of the remaining PDCCH candidates in the same monitoring occasion and all remaining monitoring occasions may be dropped by UE 110.

In a second approach, pattern-based switching may be configured by radio resource control (RRC) to spare DCI reception and parsing. Optionally, subframe (or half-subframe) boundary restriction may not apply as opposed to inactivity timer. For instance, each BWP may have a parameter of downcount and nextBWP. Alternatively, or additionally, one or more measurement outcomes may trigger the appropriate BWP switching events. In the second approach, a flag may be utilized to enable automatic return or switch back to BWP before last switching after the parameter downcount of a countdown timer elapsed. Moreover, dynamic signaling may be utilized for enabling and disabling pattern-based switching. For instance, special bits may be included in the DCI. Alternatively, or additionally, the dynamic BWP switching mechanism may be used for enabling and/or disabling. Dynamic switching to the default BWP may disable the pattern-based switching. Dynamic switching to a BWP configured with pattern-based switching may start the pattern.

Figure 2:
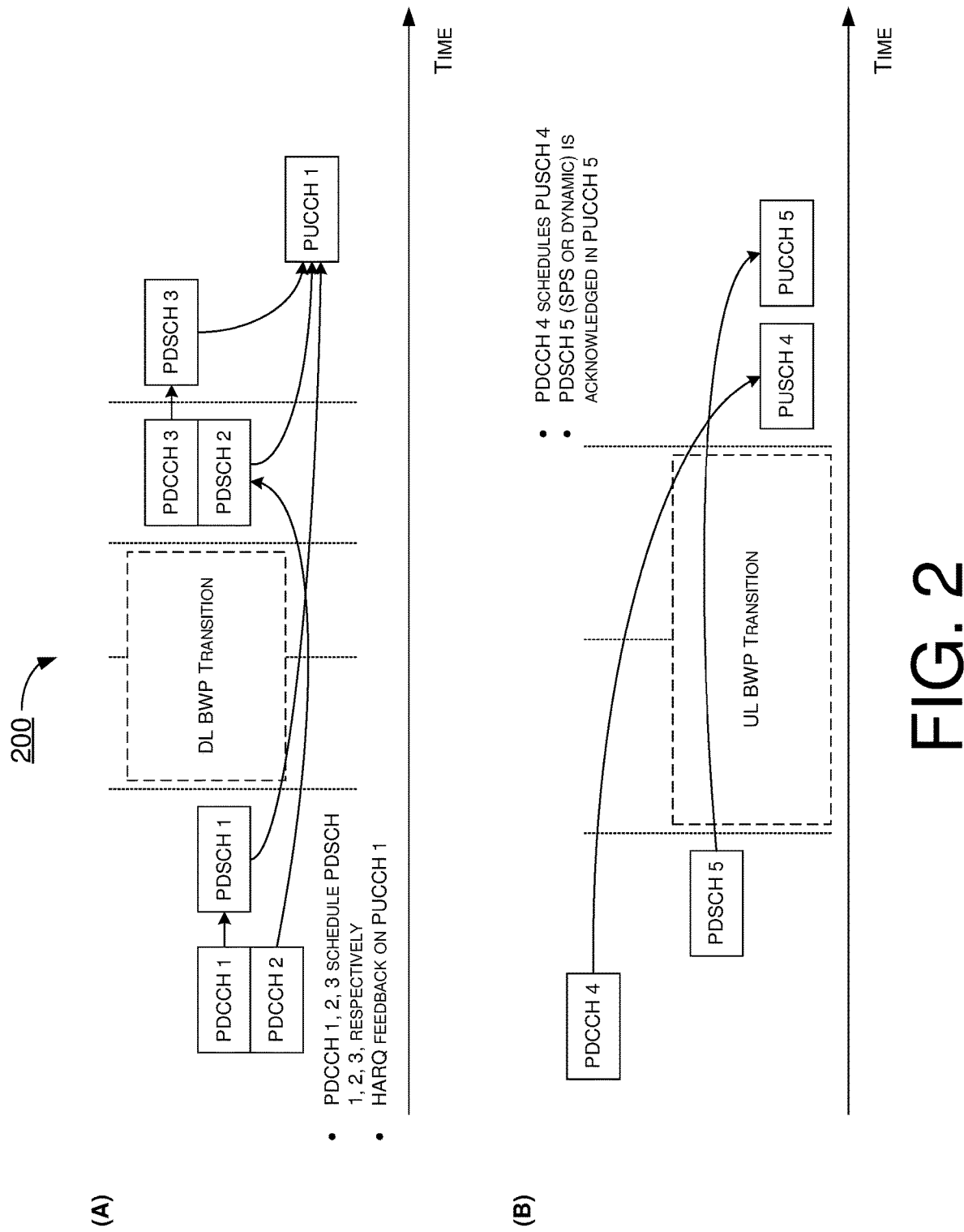
FIG. 2 is a diagram of an example scenario under a proposed scheme in accordance with the present disclosure.

FIG. 2 illustrates an example scenario 200 in which several proposed schemes described below with respect to seamless scheduling across multiple BWPs may be implemented. Under a fifth proposed scheme in accordance with the present disclosure, BWP switching may be transparent to PDSCH scheduling and PDSCH repetitions/aggregation. For instance, DL BWP switching may be transparent, and the transmission time may be excluded from K0 and K1 (sub-)slot offsets. Under a sixth proposed scheme in accordance with the present disclosure, for seamless DL hybrid automatic repeat request (HARQ) operation, BWP transition may be transparent to codebook generation and PUCCH transmission. Codebook generation and N1 timeline may exclude the transition duration. Identical PUCCH configuration per BWP may be applied. Under a seventh proposed scheme in accordance with the present disclosure, BWP switching may be transparent to PUCCH/PUSCH scheduling and PUCCH/PUSCH repetitions. For instance, UL BWP switching may be transparent, and the transition time may be excluded from K2 slot offset and from the N1 and N2 processing timeline of UE 110.

Referring to part (A) FIG. 2, which shows DL BWP transition, PDCCH 1, PDCCH 2 and PDCCH 3 may schedule PDSCH 1, PDSCH 2 and PDSCH 3, respectively, and HARQ feedback may be transmitted on PUCCH 1. PDSCH 1 is scheduled by PDCCH 1 before the DL BWP transition and also occurs before the DL BWP transition. PDSCH 2 is scheduled by PDCCH 1 before the DL BWP transition and occurs after the DL BWP transition. PDSCH 3 is scheduled by PDCCH 3 after the DL BWP transition and also occurs after the DL BWP transition. One or more HARQ codebooks for PDSCH 1, PDSCH 2 and PDSCH 3 may be transmitted in the same PUCCH 1.

Referring to part (B) of FIG. 2, which shows UL BWP transition, PDCCH 4 may schedule PUSCH 4. Furthermore, PDSCH 5 (which may be SPS or dynamic) may be acknowledged in PUCCH 5. PUSCH 4 is scheduled by PDCCH 4 before the UL BWP transition and occurs after the UL BWP transition. PUCCH 5 is scheduled by PDSCH 5 (which may be dynamic or SPS) before the UL BWP transition and occurs after the UL BWP transition.

Figure 3:
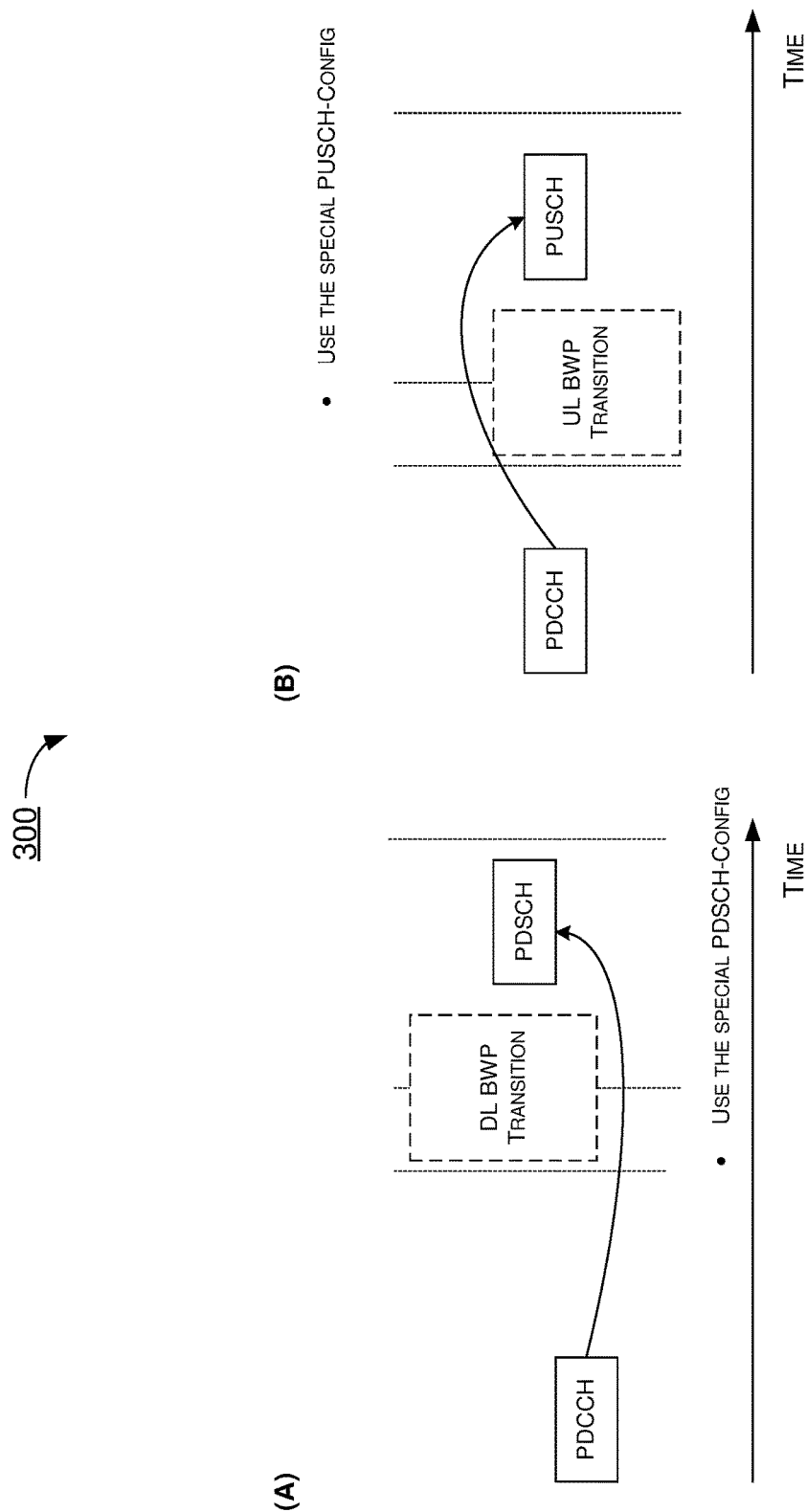
FIG. 3 is a diagram of an example scenario under a proposed scheme in accordance with the present disclosure.

FIG. 3 illustrates an example scenario 300 in which several proposed schemes described below with respect to transition over fractional slot duration and adaptive TDRA may be implemented. Under an eight proposed scheme in accordance with the present disclosure, for specific SOS's, UE 110 may be capable of transmitting PUSCH or receiving PDSCH immediately after the UL or DL BWP switching duration has elapsed (e.g., without alignment to a slot boundary) with or without certain adaptive TDRA. Under the eighth proposed scheme, UE 110 may be configured with a PUSCH/PDSCH TDRA table for the case where the transition duration from the BWP switching overlaps with the scheduled slot. For instance, each BWP of UE 110 may be configured with special PUSCH/PDSCH configurations for the case of overlap in addition to the default ones. Moreover, any actual configuration in the special configurations may override the respective configuration in the default one for the slot that overlapped with the transition. Moreover, the eighth proposed scheme may be applied to SCS=15 kHz. For all other SCSs, SCS alignment may apply. Referring to part (A) of FIG. 3, he special PDSCH configuration (PDSCH-Con fig) may be used. Referring to part (B) of FIG. 3, the special PUSCH configuration (PUSCH-Con fig) may be used.

Illustrative Implementations

Figure 4:
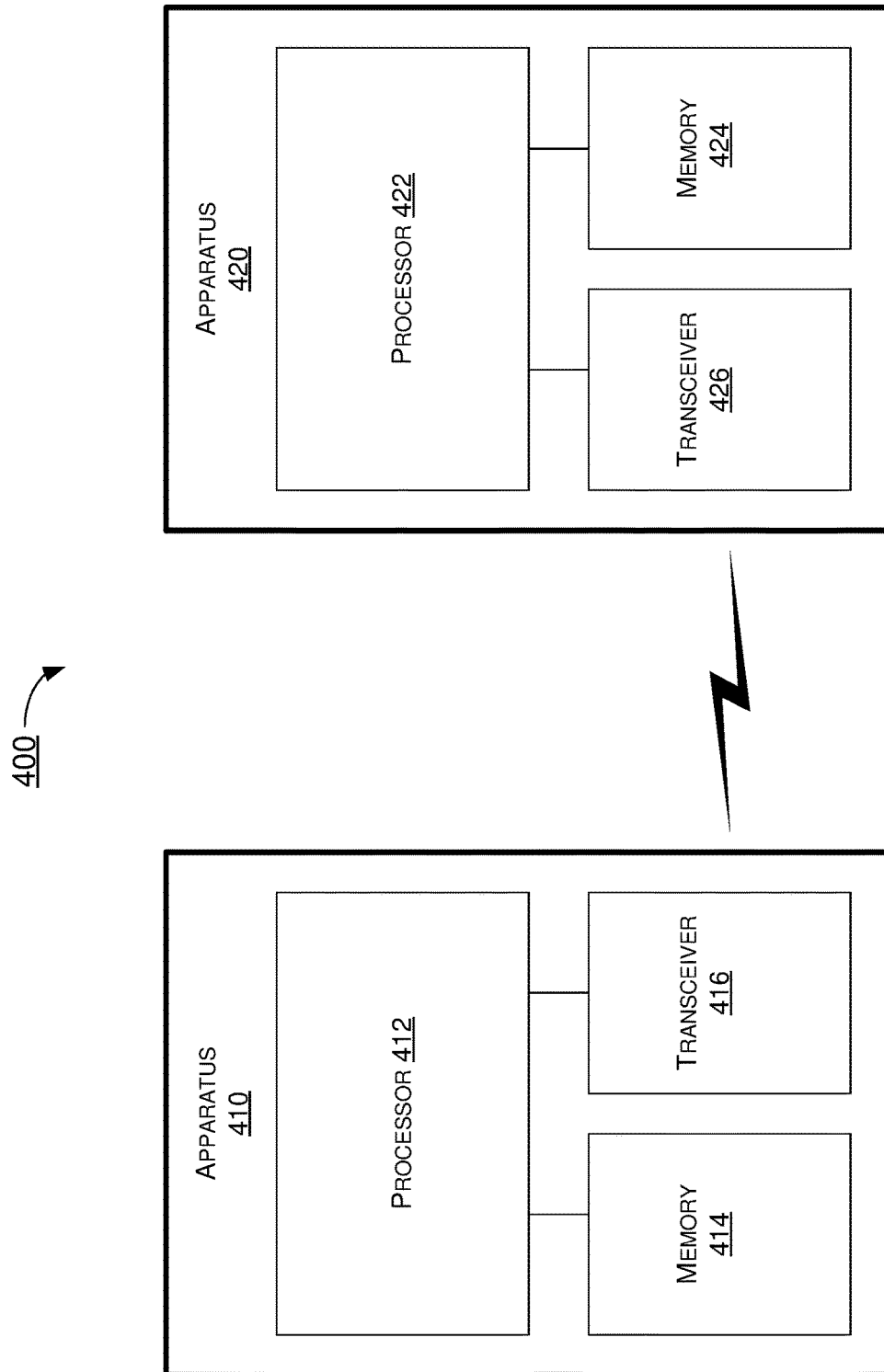
FIG. 4 is a block diagram of an example communication system in accordance with an implementation of the present disclosure.

FIG. 4 illustrates an example communication system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to enhancements for faster BWP switching in mobile communications, including the various schemes described above with respect to various proposed designs, concepts, schemes, systems and methods described above, including network environment 100, as well as processes described below.

Each of apparatus 410 and apparatus 420 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 410 and apparatus 420 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to enhancements for faster BWP switching in mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE (e.g., UE 110), and apparatus 420, as a network node (e.g., network node 125) of a wireless network (e.g., network 120 as a 5G/NR mobile network), is provided below.

Under various proposed schemes in accordance with the present disclosure pertaining to enhancements for faster BWP switching in mobile communications, processor 412 of apparatus 410, implemented in or as UE 110, may receive, via transceiver 416, a trigger from a network node of a wireless network (e.g., apparatus 420 as network node 125 of wireless network 120). Additionally, processor 412 may, in response to receiving the trigger, perform BWP switching with a restriction on SW or RF reconfiguration such that the BWP switching is faster with the restriction than without the restriction. Moreover, processor 412 may perform, via transceiver 416, a transmission (e.g., UL transmission) to the network node.

In some implementations, the restriction may involve maintaining all configurations for DL BWP switching identical. Alternatively, the restriction may involve maintaining all configurations for UL BWP switching identical.

In some implementations, the restriction may involve maintaining a subset of all configurations for the BWP switching identical.

In some implementations, in maintaining the subset of all configurations for the BWP switching identical, processor 412 may maintain a same SCS. Alternatively, or additionally, in maintaining the subset of all configurations for the BWP switching identical, processor 412 may maintain a same CP. Alternatively, or additionally, in maintaining the subset of all configurations for the BWP switching identical, processor 412 may maintain a same bandwidth but different RB offsets with respect to a RB determined by high-layer parameters. Alternatively, or additionally, in maintaining the subset of all configurations for the BWP switching identical, processor 412 may maintain different BWP indexes. Alternatively, or additionally, in maintaining the subset of all configurations for the BWP switching identical, processor 412 may maintain partly or fully identical PUCCH, PUSCH, CG or SRS configuration for an UL BWP. Alternatively, or additionally, in maintaining the subset of all configurations for the BWP switching identical, processor 412 may maintain partly or fully identical PDCCH, PDSCH, SPS or RLM configuration for a DL BWP.

In some implementations, the restriction may involve changing a center frequency, a bandwidth, or both the center frequency and the bandwidth, without changing other RF configurations.

Under some other proposed schemes in accordance with the present disclosure pertaining to enhancements for faster BWP switching in mobile communications, processor 412 of apparatus 410, implemented in or as UE 110, may receive, via transceiver 416, a trigger from a network node of a wireless network (e.g., apparatus 420 as network node 125 of wireless network 120). Additionally, processor 412 may, in response to receiving the trigger, perform BWP switching with a redefined beginning of a BWP transition timeline such that the BWP switching is faster with the redefined beginning of the BWP transition timeline than without the redefined beginning of the BWP transition timeline. Moreover, processor 412 may perform, via transceiver 416, a transmission (e.g., UL transmission) to the network node.

In some implementations, the trigger may include a DCI signal. In such cases, the redefined beginning of the BWP transition timeline may exclude time of reception and parsing of the DCI signal.

In some implementations, a new search space in which the DCI signal is received may be defined. In such cases, searching for the DCI signal in the new search space may be prioritized.

In some implementations, in performing the BWP switching, processor 412 may perform certain operations. For instance, processor 412 may decode the DCI signal. Moreover, upon successfully decoding the DCI signal, processor 412 may perform either of the following: (a) ceasing to process one or more remaining monitoring occasions; or (b) ceasing to process one or more remaining PDCCH candidates in a same monitoring occasion in which the DCI is monitored and all remaining monitoring occasions.

In some implementations, the trigger may include a RRC signal. In such cases, the BWP switching may include a pattern-based switching configured by the RRC signal.

In some implementations, the trigger may include a flag that enables automatic return and switch back to a default BWP before a last switching after a countdown counter elapsed.

In some implementations, the trigger may include a dynamic signaling. In such cases, the BWP switching may include a pattern-based switching which is enabled or disabled by the dynamic signaling. Moreover, the dynamic signaling may include one or more special bits in a DCI signal. Alternatively, or additionally, the pattern-based switching may be disabled responsive to the dynamic signaling switching to a default BWP, and the pattern-based switching may be enabled responsive to the dynamic signaling triggering switching to another BWP configured with a pattern used in the pattern-based switching.

Illustrative Processes

Figure 5:
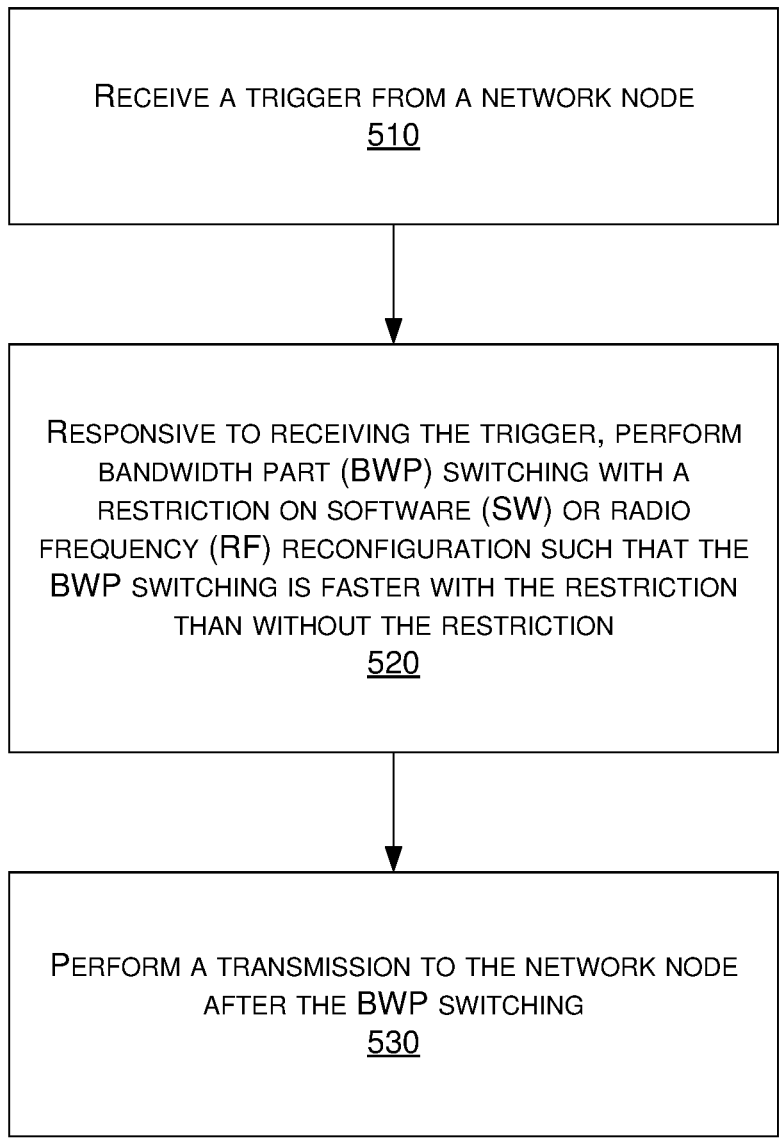
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above, whether partially or entirely, including those pertaining to those described above. More specifically, process 500 may represent an aspect of the proposed concepts and schemes pertaining to enhancements for faster BWP switching in mobile communications. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE (e.g., UE 110) and apparatus 420 as a communication entity such as a network node or base station (e.g., network node 125) of a wireless network (e.g., wireless network 120). Process 500 may begin at block 510.

At 510, process 500 may involve processor 412 of apparatus 410 receiving, via transceiver 416, a trigger from a network node of a wireless network (e.g., apparatus 420 as network node 125 of wireless network 120). Process 500 may proceed from 510 to 520.

At 520, process 500 may involve processor 412, in response to receiving the trigger, performing BWP switching with a restriction on SW or RF reconfiguration such that the BWP switching is faster with the restriction than without the restriction. Process 500 may proceed from 520 to 530.

At 530, process 500 may involve processor 412 performing, via transceiver 416, a transmission (e.g., UL transmission) to the network node.

In some implementations, the restriction may involve maintaining all configurations for DL BWP switching identical. Alternatively, the restriction may involve maintaining all configurations for UL BWP switching identical.

In some implementations, the restriction may involve maintaining a subset of all configurations for the BWP switching identical.

In some implementations, in maintaining the subset of all configurations for the BWP switching identical, process 500 may involve processor 412 maintaining a same SCS. Alternatively, or additionally, in maintaining the subset of all configurations for the BWP switching identical, process 500 may involve processor 412 maintaining a same CP. Alternatively, or additionally, in maintaining the subset of all configurations for the BWP switching identical, process 500 may involve processor 412 maintaining a same bandwidth but different RB offsets with respect to a RB determined by high-layer parameters. Alternatively, or additionally, in maintaining the subset of all configurations for the BWP switching identical, process 500 may involve processor 412 maintaining different BWP indexes. Alternatively, or additionally, in maintaining the subset of all configurations for the BWP switching identical, process 500 may involve processor 412 maintaining partly or fully identical PUCCH, PUSCH, CG or SRS configuration for an UL BWP. Alternatively, or additionally, in maintaining the subset of all configurations for the BWP switching identical, process 500 may involve processor 412 maintaining partly or fully identical PDCCH, PDSCH, SPS or RLM configuration for a DL BWP.

In some implementations, the restriction may involve changing a center frequency, a bandwidth, or both the center frequency and the bandwidth, without changing other RF configurations.

Figure 6:
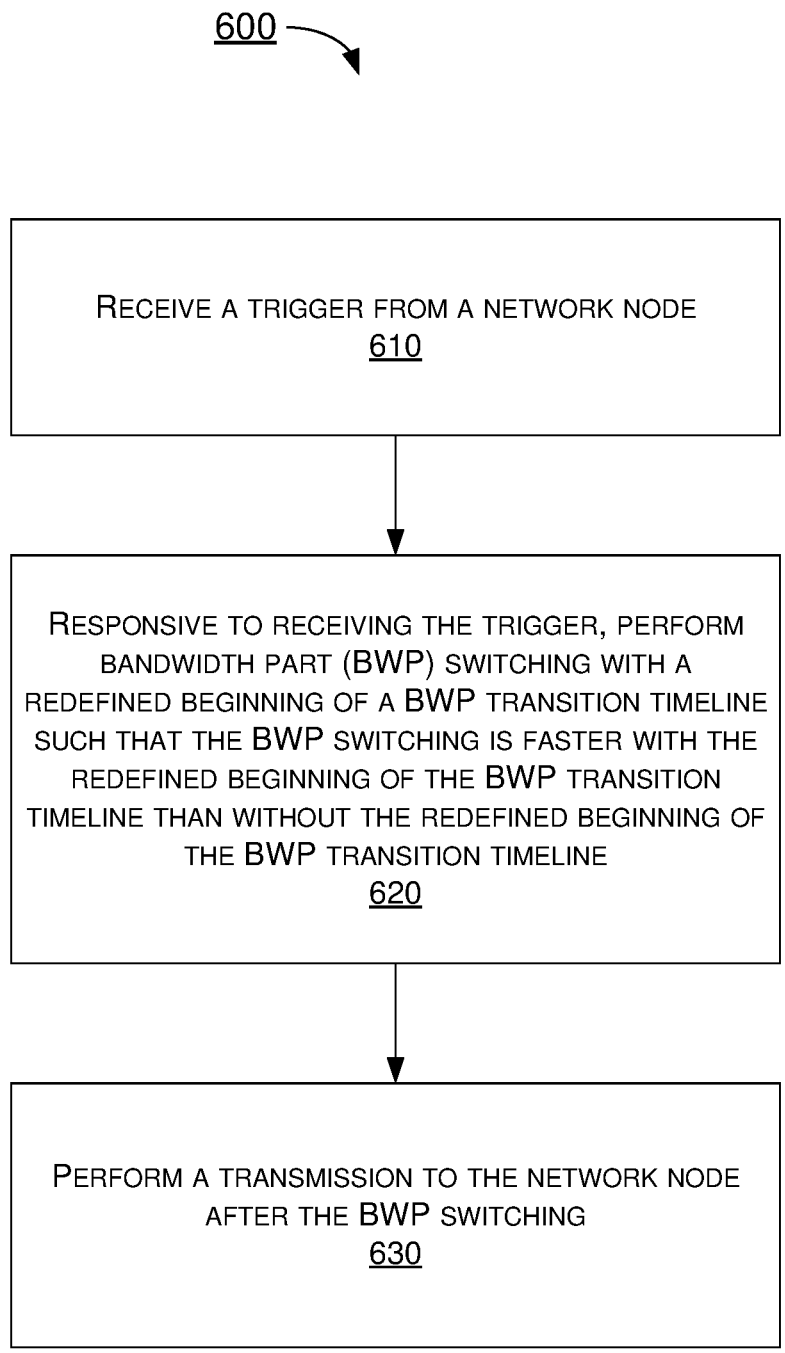
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above, whether partially or entirely, including those pertaining to those described above. More specifically, process 600 may represent an aspect of the proposed concepts and schemes pertaining to enhancements for faster BWP switching in mobile communications. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed iteratively. Process 600 may be implemented by or in apparatus 410 and apparatus 420 as well as any variations thereof. Solely for illustrative purposes and without limiting the scope, process 600 is described below in the context of apparatus 410 as a UE (e.g., UE 110) and apparatus 420 as a communication entity such as a network node or base station (e.g., network node 125) of a wireless network (e.g., wireless network 120). Process 600 may begin at block 610.

At 610, process 600 may involve processor 412 of apparatus 410 receiving, via transceiver 416, a trigger from a network node of a wireless network (e.g., apparatus 420 as network node 125 of wireless network 120). Process 600 may proceed from 610 to 620.

At 620, process 600 may involve processor 412, in response to receiving the trigger, performing BWP switching with a redefined beginning of a BWP transition timeline such that the BWP switching is faster with the redefined beginning of the BWP transition timeline than without the redefined beginning of the BWP transition timeline. Process 600 may proceed from 620 to 630.

At 630, process 600 may involve processor 412 performing, via transceiver 416, a transmission (e.g., UL transmission) to the network node.

In some implementations, the trigger may include a DCI signal. In such cases, the redefined beginning of the BWP transition timeline may exclude time of reception and parsing of the DCI signal.

In some implementations, a new search space in which the DCI signal is received may be defined. In such cases, searching for the DCI signal in the new search space may be prioritized.

In some implementations, in performing the BWP switching, process 600 may involve processor 412 performing certain operations. For instance, process 600 may involve processor 412 decoding the DCI signal. Moreover, upon successfully decoding the DCI signal, process 600 may involve processor 412 performing either of the following: (a) ceasing to process one or more remaining monitoring occasions; or (b) ceasing to process one or more remaining PDCCH candidates in a same monitoring occasion in which the DCI is monitored and all remaining monitoring occasions.

In some implementations, the trigger may include a RRC signal. In such cases, the BWP switching may include a pattern-based switching configured by the RRC signal.

In some implementations, the trigger may include a flag that enables automatic return and switch back to a default BWP before a last switching after a countdown counter elapsed.

In some implementations, the trigger may include a dynamic signaling. In such cases, the BWP switching may include a pattern-based switching which is enabled or disabled by the dynamic signaling. Moreover, the dynamic signaling may include one or more special bits in a DCI signal. Alternatively, or additionally, the pattern-based switching may be disabled responsive to the dynamic signaling switching to a default BWP, and the pattern-based switching may be enabled responsive to the dynamic signaling triggering switching to another BWP configured with a pattern used in the pattern-based switching.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving a trigger from a network node;
   responsive to receiving the trigger, performing bandwidth part (BWP) switching with a restriction on software (SW) or radio frequency (RF) reconfiguration such that the BWP switching is faster with the restriction than without the restriction; and
   performing a transmission to the network node after the BWP switching,
   wherein the trigger comprises a downlink control information (DCI) signal, and
   wherein the restriction involves more than one of:
      prioritizing monitoring of a new search space (SS);
      imposing blind decoding (BD) and aggregation level (AL) restrictions on the SS;
      dropping one or more remaining monitoring occasions in a same monitoring occasion in which the DCI signal is received following successful decoding of the DCI signal; and
      dropping one or more remaining physical downlink control channel (PDCCH) candidates in the same monitoring occasion in which the DCI signal is received following the successful decoding of the DCI signal.

2. The method of claim 1, wherein the restriction further comprises maintaining all configurations for downlink (DL) BWP switching identical.

3. The method of claim 1, wherein the restriction further comprises maintaining all configurations for uplink (UL) BWP switching identical.

4. The method of claim 1, wherein the restriction further comprises maintaining a subset of all configurations for the BWP switching identical.

5. The method of claim 4, wherein the maintaining of the subset of all configurations for the BWP switching identical comprises maintaining a same subcarrier spacing (SCS).

6. The method of claim 4, wherein the maintaining of the subset of all configurations for the BWP switching identical comprises maintaining a same cyclic prefix (CP).

7. The method of claim 4, wherein the maintaining of the subset of all configurations for the BWP switching identical comprises maintaining a same bandwidth but different resource block (RB) offsets with respect to a RB determined by high-layer parameters.

8. The method of claim 4, wherein the maintaining of the subset of all configurations for the BWP switching identical comprises maintaining different BWP indexes.

9. The method of claim 4, wherein the maintaining of the subset of all configurations for the BWP switching identical comprises maintaining partly or fully identical physical uplink control channel (PUCCH), physical uplink shared channel (PUSCH), configured grant (CG) or sounding reference signal (SRS) configuration for an uplink (UL) BWP.

10. The method of claim 4, wherein the maintaining of the subset of all configurations for the BWP switching identical comprises maintaining partly or fully identical physical downlink control channel (PDCCH), physical downlink shared channel (PDSCH), semi-persistent scheduling (SPS) or radio link monitoring (RLM) configuration for a downlink (DL) BWP.

* * * * *